Jan. 14, 1964    J. MÜLLER    3,117,492
MACHINE TOOL

Filed Nov. 14, 1960    2 Sheets-Sheet 1

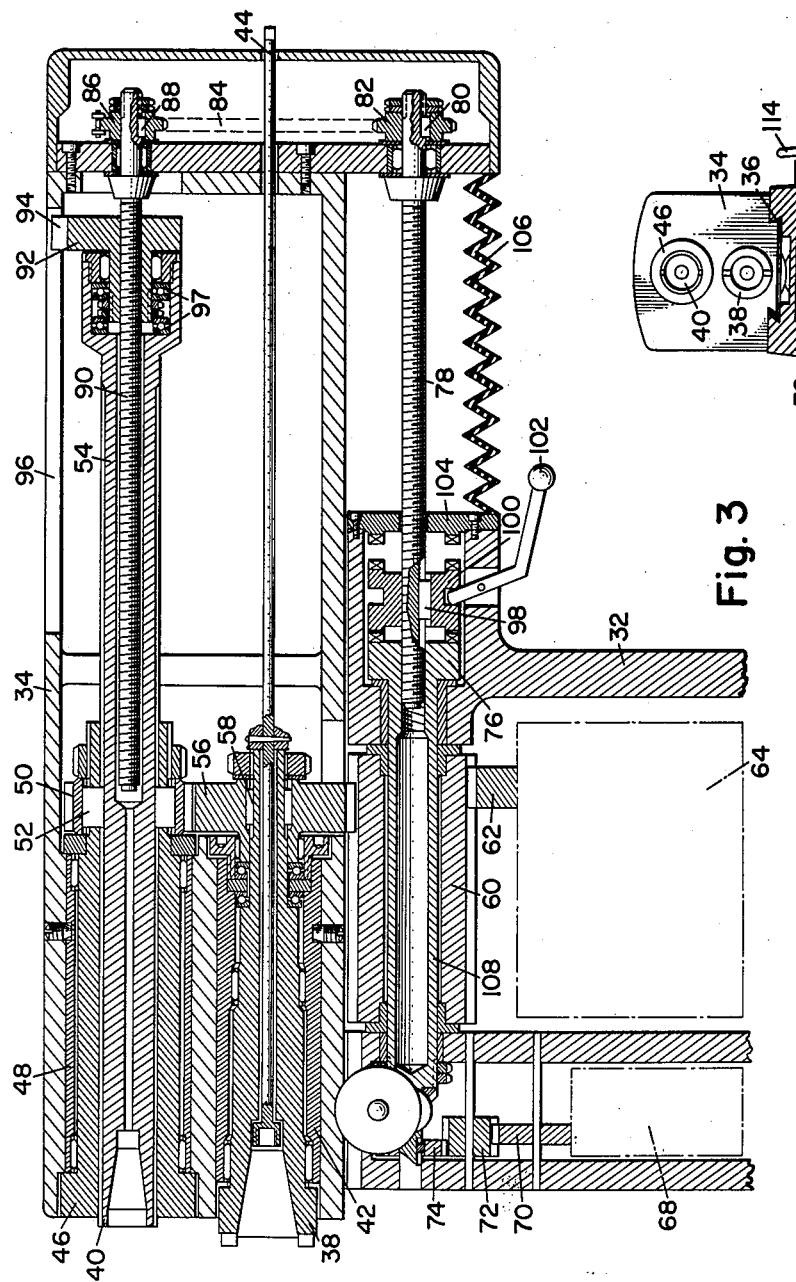
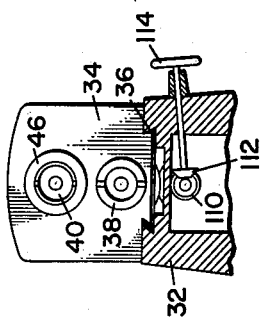

United States Patent Office 3,117,492
Patented Jan. 14, 1964

3,117,492
MACHINE TOOL
Johann Müller, Munich, Germany, assignor to Hans Deckel, Munich, Germany, and Friedrich Wilhelm Deckel, Zug, Switzerland
Filed Nov. 14, 1960, Ser. No. 68,933
Claims priority, application Germany Nov. 19, 1959
5 Claims. (Cl. 90—11)

This invention relates to a machine tool, and particularly to a milling machine having a spindle head which is displaceable in the direction of the axis of the tool spindle (or the axes of the tool spindles, if more than one) relative to the gear case, and in which at least one tool spindle is displaceable in the same direction relatively to the spindle head.

Machine tools of this construction have the advantage of a large working range of the tool, because after exhausting the displaceability of the spindle head relative to the gear case on which it slides, the tool spindle itself can then be further displaced in the same direction, being pushed axially out of the spindle head. Such a machine tool can also be used as a boring machine, due to the possibility of advancing the tool in the direction of the axis of the tool spindle.

Prior machines of this character have not been able to take full advantage of these possibilities, however, because for precision work a mechanically driven feed is necessary, and because in the prior machines of this general character a mechanically driven feed has been available either only for the feeding of the spindle head, or only for the feeding of the tool spindle, while the other one of these feeding motions has had to be performed manually.

An object of the present invention is the provision of a generally improved and more satisfactory machine tool of the general character above mentioned.

Another object of the invention is the provision of a machine tool of the general character above mentioned, in which there is provision for mechanical feed of the spindle head, and also mechanical feed of the tool spindle itself in an axial direction relative to the spindle head.

Still another object is the provision of a machine tool of the general type above indicated, in which the feed of the spindle head and also the axial feed of the spindle itself may be effected by mechanical driving means, both feeds preferably being from a common source of power.

Still a further object is the provision of a particularly compact and simple mechanical feed arrangement comprising minimum parts, so designed and arranged that the mechanical feed may be used alternatively either for feeding the spindle head relative to the machine part on which it is mounted, or for feeding the tool spindle itself in an axial direction relative to the spindle head.

These and other desirable objects may be attained in the manner disclosed as an illustrative embodiment of the invention in the following description and in the accompanying drawings forming a part hereof, in which:

FIG. 3 is a vertical section taken longitudinally through the tool spindles, the spindle head, and the upper part of the gear case;

FIG. 5 is a schematic view partly in vertical section and partly in front elevation of the spindle head.

The same reference numerals throughout the several views indicate the same parts.

Figure 1:
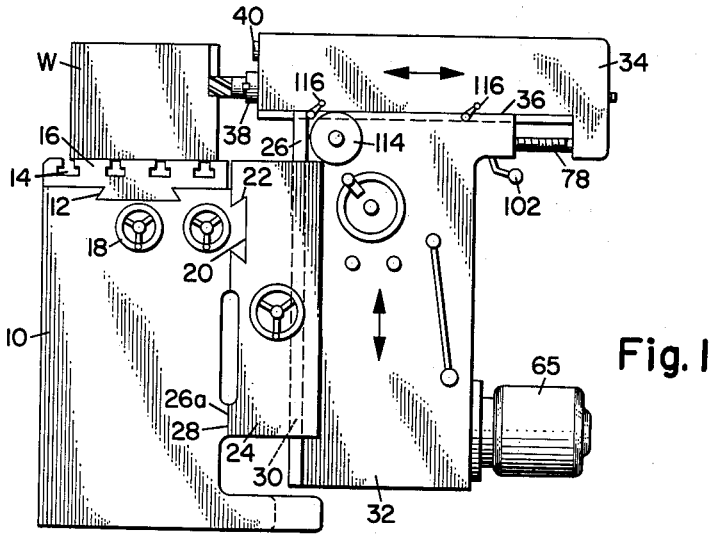
FIG. 1 is an elevation of a milling machine according to a preferred embodiment of the invention.
Figure 4:
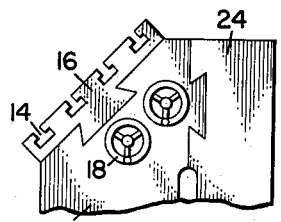
FIG. 4 is a fragmentary view similar to the upper left corner of FIG. 1, showing an alternative construction of the work holding table.
Figure 2:
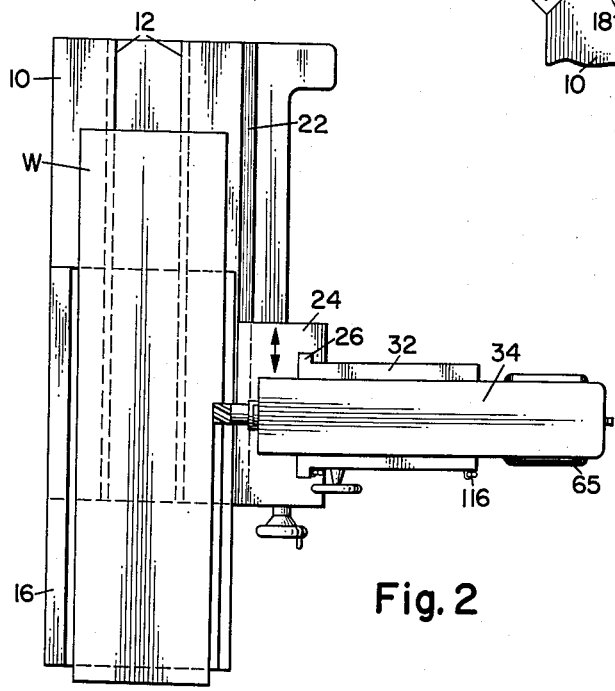
FIG. 2 is a top plan view of the same.

Referring first to FIGS. 1 and 2, there is shown somewhat schematically a typical milling machine of a kind with which the present invention is useful. The machine comprises a stationary column or main frame 10 which carries a work table 16 movable longitudinally along the column or frame 10 in a horizontal guideway 12. The top surface of the work table 16 may be either horizontal, as in FIG. 1, or inclined obliquely at an angle faced away from the spindle head, as in FIG. 4. In either case, the table 16 is provided with undercut or T-shaped clamping grooves 14 to which the work W may be clamped. The table may be moved horizontally by the hand wheel 18, or may be mechanically driven in a horizontal direction by mechanical drive means of conventional form, the details of which are not important for purposes of the present invention.

On the upright and substantially vertical rear face of the column or frame 10 there is provided a dovetailed guide 20 extending in a horizontal direction and parallel to the direction of the guide 12 along which the table 16 moves. The slide member 24 moves horizontally along the guide 20, the slide having a guide slot 22 corresponding to and mating with the dovetailed guide 20. Preferably also there is a vertical supporting surface 26a formed on the rear face of the member 10 and extending in a horizontal direction somewhat below the guide 20. A mating surface 28 of the slide 24 rests against and slides horizontally on the surface 26a, to give added support to the slide 24.

The slide 24 contains a T-shaped vertical guide slot 30 which receives lateral flanges 26 at the front edge of the gear box 32, so that the gear box 32 is movable vertically on the slide 24. The gear box 32 contains in it or on it the usual drive means, control means, and switching means of conventional construction, the details of which are not important for purposes of the present invention and hence are not shown.

On the top of the gear box 32 is a spindle head 34 which is displaceable horizontally along horizontal dovetailed guides 36 extending in a direction at right angles to the direction of the guides 12 and 20.

The spindle head 34 contains at least one spindle which is displaceable axially relatively to the spindle head. Preferably it has also another spindle which is not displaceable axially and which, therefore, can be supported in a somewhat more sturdy manner, thus being well adapted for heavy duty use in performing work which does not require axial displaceability of the spindle.

Referring now to FIG. 3, the spindle which is axially fixed in the spindle head is shown at 38, and the axially displaceable spindle is indicated at 40. The spindle 38 is supported in a rotatable but axially fixed manner in a fixed bushing 42, and is provided with a clamping device 44 of known form, for holding the tool. The other spindle 40 is axially displaceable in the rotary bushing 46 which is axially fixed, the bushing 46 being rotatably supported in a fixed bushing 48.

The bushing 46 carries a gear 50. By means of keys 52 which pass radially through slots in the bushing 46 and which engage in longitudinal keyways 54 in the tool spindle 40, the gear 50 is connected to the spindle 40 in all axially displaced positions of the latter, so that the gear 50, the bushing 46, and the tool spindle 40 all rotate together.

The teeth of the gear 50 are in meshing engagement with the teeth of the gear 56, which is connected by the key 58 with the spindle 38. The lower edge of the gear 56 extends through an opening in the bottom of the spindle head 34 and an opening in the top of the gear box 32, into meshing engagement with a wide gear 60 within the gear box. The teeth of the gear 60 are sufficiently wide (in an axial direction) so that the gear 56 remains in meshing engagement with the gear 60 throughout the entire range of displacement of the spindle head 34 relative to the gear box 32, along the guideway 36. By means of another gear 62 which meshes with the gear 60, the latter is connected with the drive gearing, indicated diagrammatically at 64 and driven from any suitable source of power such as the motor 65 (FIG. 1). The details of the drive of the gear 62 from the motor are unimportant for purposes of the present invention, so are not illustrated here.

In addition to the spindle drive gearing indicated diagrammatically at 64, the gear box 32 also contains feed drive gearing indicated diagrammatically at 68, the details of which likewise are unimportant for purposes of the present invention, and may be entirely conventional. It may be driven from the same motor 65, or from a separate motor, as desired. The feed drive gearing 68 drives a gear 70 which meshes with and drives a gear 72 meshing in turn with a gear 74 at the front end of a hollow shaft 108, the rear end of which shaft is formed as an internally threaded nut 76. The nut 76 and power shaft 108 are supported in the gear box 32 for rotation but held against longitudinal or axial movement relative to the gear box.

An externally threaded rod or feed spindle 78 has its forward end extending into the nut 76 in threaded engagement with the internal threads thereof, and the rod extends rearwardly from the nut to a rear end which is rotatable but not axially displaceable in the spindle head 34. Thus any longitudinal or axial motion imparted to the rod 78 will in turn be imparted to the spindle head, moving the latter in one direction or the other along its guideways 36.

At the rear end of the feed rod or spindle 78, rigidly connected for rotation with it by means of the key 80, is a sprocket wheel 82, which is connected by a chain 84 with a sprocket wheel 86 firmly fastened by a key 88 to a threaded feed spindle 90 which is supported rotatably but not axially displaceable in the spindle head 34. In engagement with the external screw threads of the spindle 90 is seated a nut 92 having a lug 94 which extends into a longitudinal slot 96 of the spindle head 34, to prevent rotation of the nut 92 while allowing the nut to travel longitudinally along the slot 96 if the spindle 90 is turned. Thus nut 92 is connected in a rotatable but axially non-displaceable manner with the tool spindle 40, by means of ball bearings or roller bearings indicated at 97.

On the threaded spindle or rod 78 there is seated in an axially displaceable manner, but connected for rotation with the rod 78 by means of a key 98, a coupling sleeve or shiftable clutch member 100, which by means of a shift lever 102 can be moved axially to a forward position in which clutch teeth on the member 100 engage clutch teeth on the nut 76, or to a rear position in which clutch teeth on the member 100 engage stationary clutch teeth on a stationary plate member 104 mounted on the gear box 32.

Preferably the spindle 78 is protected from dirt and chips by bellows 106, shown diagrammatically in FIG. 3 but omitted from FIG. 1 for the sake of showing the construction which would be hidden by the bellows.

The hollow shaft part 108 of the nut 76 has fixed to it a bevel gear 110 (FIG. 5) which meshes with a bevel gear 112 on the shaft of an external hand wheel 114, so that the parts may be turned by hand when desired, rather than through the mechanical drive gearing 68, 74.

When the mechanism is adjusted so that there is no feeding movement of the spindle head 34, the spindle head can be clamped fast in its guides 36 by clamping means 116 (FIGS. 1 and 2).

The operation of the machine is as follows: The work W is suitably mounted on and clamped to the table 16. Since the spindle head 34 is movable in three coordinate directions mutually perpendicular to each other relatively to the stationary column or machine frame 10, as shown by the double-headed arrows in FIGS. 1 and 2, it follows that machining of the workpiece may be accomplished in all directions while the workpiece remains stationary. But if desired, longitudinal machining may be accomplished wholly or partly by moving the workpiece table 16 along its guideway 12.

The tool is mounted in one or the other of the spindles 38 and 40, the spindle 38 being preferred whenever no longitudinal feeding movement of the spindle is required, because this spindle 38 is more sturdy and less subject to possible deflection than the longitudinally movable spindle 40. In either event, both spindles are driven simultaneously through the gearing 60, 62, 64.

If it is desired to feed the spindle head 34 along its guideway 36, toward or away from the workpiece W, the lever 102 is shifted to move the clutch member 100 rearwardly (to the right as seen in FIG. 3) so that the jaws thereof engage and interlock with the jaws on the stationary plate 104. Since the clutch member 100 is non-rotatably connected to the feed spindle 78, this position of the clutch prevents the feed spindle 78 from turning. Then when the gearing 68, 70, 72, 74 is operated to drive the hollow shaft member 108 and its integral nut 76 in one direction or the other, the nut 76 turning on the external screw threads of the feed spindle 78 will move the spindle longitudinally in one direction or the other (depending upon the direction of rotation of the nut) so that the spindle is telescoped into or out of the hollow part of the shaft 108, drawing the spindle head 34 forwardly (to the left as in FIG. 1, 2, and 3) or pushing it rearwardly, as the case may be, along the guides 36. Since the feed spindle 78 does not rotate at this time, there is no longitudinal feeding motion of the tool spindle 40, but this tool spindle nevertheless rotates along with the other tool spindle 38.

If, on the other hand, it is desired to feed the spindle 40 longitudinally while the spindle head 34 remains stationary on the gear case 32, then the shift lever 102 is operated to move the clutch member 100 forwardly to engage its teeth with the teeth on the nut 76, this being the position of the parts shown in FIG. 3. This couples the feed spindle 78 to the nut 76 so that both must turn together. Therefore, when the nut 76 and its hollow shaft 108 are driven in one direction or the other through the gearing 68, 70, 72, 74, the spindle 78 will likewise turn, and since there will be no relative rotation between the nut 76 and the spindle 78, there will be no longitudinal movement of the feed spindle. However, the rotation of the feed spindle 78 will be transmitted through the chain drive 84 to the threaded feed member 90 of the tool spindle 40. Since the nut 92 on the threads of the feed member 90 cannot turn (on account of the lug 94 engaging in the slot 96) it follows that rotation of the member 90 will cause the nut 92 to travel in one direction or the other along the member 90, depending on the direction of rotation. The longitudinal travel of the nut 92 will be transmitted to the tool spindle 40, causing corresponding feeding movement of the spindle 40 in one direction or the other.

For ordinary milling work or for other work which does not require feeding either the spindle head 34 or the tool spindle, the feeding mechanism above described is disconnected from the source of power at any suitable disconnection point in the gearing indicated diagramatically at 68 or between the motor and such gearing, so that the mechanically driven feed does not operate at all. However, the position of the tool relative to the work may be adjusted by means of the hand wheel 114. Especially when heavy milling work is to be done, the additional non-displaceable strong tool spindle 38 is particularly suitable, it being provided with a clamping device 44 for holding the tool.

With the present invention, it is seen that in general one can operate in most cases with the spindle head feed alone, and with the tool mounted in the non-displaceable tool spindle 38 supported relatively rigidly and sturdily in the spindle head. But if there is an unfavorable shape of the workpiece which prevents the spindle head from being brought sufficiently close to the work to use the spindle 38, or if there are other special considerations, the spindle feed may be operatively connected to project the tool spindle 40 to any desired extent (within its range of travel, of course) from the spindle head 34, and it may be used in this position, the accuracy of the machining decreasing somewhat with the length of the extended spindle. The spindle 40 may be left in a predetermined extended position during certain kinds of machining operations, or it may be fed axially during the progress of the machining operation, when required by the character of the work to be done. This versatility of the machine tool is accomplished by the use of a minimum number of extra parts, arranged very compactly.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A machine tool comprising a gear case, a spindle head mounted on said gear case, a plurality of tool spindles rotatably mounted in said spindle head with their axes parallel to each other, at least one of the tool spindles being mounted for axial feeding displacement relative to the spindle head, said spindle head being mounted for feeding displacement relative to said gear case in a direction parallel to the axes of said tool spindles, characterized by a first feed screw operatively connected to said spindle head to feed said spindle head relative to said gear case when said first feed screw is moved longitudinally relative to said gear case, spindle feed means including a second feed screw and a nut threadedly engaging said second feed screw and held against rotation in said spindle head to travel longitudinally on said second feed screw when said second feed screw is turned, an operative connection between said nut and said displaceable tool spindle to feed said displaceable tool spindle axially from axial movement of said nut, an operative connection between said first feed screw and said second feed screw to turn the latter from rotation of the former, a second nut mounted in said gear case for rotation without axial movement, said second nut being threaded on said first feed screw, power operated means for turning said second nut, and shiftable clutch means movable between two positions in one of which said first feed screw is held against rotation and in the other of which said first feed screw is coupled to said second nut to turn therewith, so that when said first feed screw is held against rotation the rotation of said second nut will cause longitudinal movement of said first feed screw to feed said spindle head relative to said gear case, and so that when said first feed screw is coupled to turn with said second nut, rotation of said second nut will not cause longitudinal movement of said first feed screw but will cause joint rotation of said first feed screw and said second feed screw, thereby feeding said displaceable tool spindle.

2. A construction as defined in claim 1, further including manually operable means for turning said second nut by hand.

3. A construction as defined in claim 1, in which at least one of the tool spindles in said spindle head is mounted therein in a non-displaceable manner, so that for heavy machining work requiring minimum deflection of the tool, a tool may be mounted in the non-displaceable spindle.

4. A machine tool comprising a gear case, a spindle head mounted on said gear case for feeding displacement relative thereto, a tool spindle rotatably mounted in said spindle head for axial feeding displacement relative to the spindle head in a direction substantially parallel to the direction of feeding displacement of said spindle head relative to said gear case, a motor mounted on said gear case, a hollow sleeve driven by said motor and rotatably mounted in said gear case for rotation without longitudinal movement about an axis substantially parallel to said direction of feeding movement of said spindle head and said tool spindle, a portion of said hollow sleeve being internally threaded, and means operated by rotation of said hollow sleeve for alternatively feeding said spindle head relative to said gear case or feeding said tool spindle relative to said spindle head, said means comprising two externally screw threaded rods mounted on said spindle head for rotation without longitudinal movement relative to said spindle head, said rods being substantially parallel to each other and to said tool spindle, the first of said rods being alined with and entering longitudinally into said tool spindle and being freely rotatable and longitudinally movable therein, the second of said rods being alined with and entering longitudinally into said hollow sleeve and being threadedly engaged with the interal threads thereof, a nut engaged with the external screw threads of the first rod and held against rotation relative to said spindle head so that rotation of the first rod will cause said nut to travel longitudinally thereon, a rotary bearing operatively connecting said nut to said tool spindle to transmit longitudinal travel of said nut to said tool spindle independently of rotation or lack of rotation of said tool spindle, drive means operatively connecting said two rods to each other for conjoint rotation, a clutch member non-rotatably mounted on said second rod for longitudinal movement thereon, stationary clutch teeth engaging said clutch member when said clutch member is shifted longitudinally to a first position, to hold said clutch member and thereby hold said second rod against rotation, so that rotation of said hollow sleeve will act like a nut on said second rod and will cause longitudinal travel of said second rod, thereby feeding said spindle head, and other clutch teeth on said hollow sleeve engaging said clutch member when said clutch member is shifted longitudinally to a second position, to cause said second rod to rotate with said hollow sleeve so that the rotation thereof will rotate said first rod and thereby cause feeding of said tool spindle.

5. A machine tool comprising a gear case, a spindle head mounted on said gear case for feeding displacement relative thereto, a tool spindle rotatably mounted in said spindle head for axial feeding displacement relative to the spindle head in a direction substantially parallel to the direction of feeding displacement of said spindle head relative to said gear case, a motor mounted on said gear case, a hollow sleeve driven by said motor and rotatably mounted in said gear case for rotation without longitudinal movement about an axis substantially parallel to said direction of feeding movement of said spindle head and said tool spindle, a portion of said hollow sleeve being internally threaded, a second tool spindle rotatably mounted in said spindle head and held against axial movement therein, said second spindle being parallel to and located between said first mentioned spindle and said hollow sleeve, and means operated by rotation of said hollow sleeve for alternatively feeding said spindle head relative to said gear case or feeding said first mentioned tool spindle relative to said spindle head, said means comprising two externally screw threaded rods mounted on said spindle head for rotation without longitudinal movement relative to said spindle head, said rods being substantially parallel to each other and to said first mentioned tool spindle, the first of said rods being alined with and entering longitudinally into said first mentioned tool spindle and being freely rotatable and longitudinally movable therein, the second of said rods being alined with and entering longitudinally into said hollow sleeve and being theradedly engaged with the internal threads thereof, a nut engaged with the external screw threads of the first rod and held against rotation relative to said spindle head so that rotation of the first rod will cause said nut to travel longitudinally thereon, a rotary bearing operatively connecting said nut to said first mentioned tool spindle to transmit longitudinal travel of said nut to said first mentioned tool spindle independently of rotation or lack of rotation of said first mentioned tool spindle, drive means operatively connecting said two rods to each other for conjoint rotation, both of said rods extending rearwardly beyond the rear end of said second tool spindle, said drive means for connecting said two rods to each other being located rearwardly beyond the rear end of said second tool spindle, a clutch member non-rotatably mounted on said second rod for longitudinal movement thereon, stationary clutch teeth engaging said clutch member when said clutch member is shifted longitudinally to a first position, to hold said clutch member and thereby hold said second rod against rotation, so that rotation of said hollow sleeve will act like a nut on said second rod and will cause longitudinal travel of said second rod, thereby feeding said spindle head, and other clutch teeth on said hollow sleeve engaging said clutch member when said clutch member is shifted longitudinally to a second position, to cause said second rod to rotate with said hollow sleeve so that the rotation thereof will rotate said first rod and thereby cause feeding of said first mentioned tool spindle.

References Cited in the file of this patent
UNITED STATES PATENTS

| | | |
|---|---|---|
| 2,052,271 | Archea | Aug. 25, 1931 |
| 2,081,145 | Gallimore et al. | May 25, 1937 |
| 2,227,410 | Johnson | Dec. 31, 1940 |
| 2,674,925 | Berthiez | Apr. 13, 1954 |

FOREIGN PATENTS

| | | |
|---|---|---|
| 532,217 | Belgium | Oct. 15, 1954 |